United States Patent [19]

Mashio

[11] Patent Number: 5,414,320

[45] Date of Patent: May 9, 1995

[54] ADJUSTING APPARATUS OF VIBRATING GYROSCOPE

[75] Inventor: Tasuku Mashio, Nagaokakyo, Japan

[73] Assignee: Murata Manufacturing Co., Ltd., Nagaokakyo, Japan

[21] Appl. No.: 260,781

[22] Filed: Jun. 16, 1994

[30] Foreign Application Priority Data

Jun. 21, 1993 [JP] Japan ................... 5-174787

[51] Int. Cl.⁶ .......................................... H01L 41/08
[52] U.S. Cl. .................... 310/311; 310/312; 29/25.35; 451/28
[58] Field of Search ............... 310/311, 312, 321, 329, 310/316, 317, 319; 29/25.35; 73/504, 517 R, 517 A, 468; 74/572; 51/281 R, 413, 165.71, 165.73

[56] References Cited

U.S. PATENT DOCUMENTS

| | | | |
|---|---|---|---|
| 2,765,765 | 10/1956 | Bigler et al. | 310/312 X |
| 2,808,523 | 10/1957 | Holmbeck | 310/312 X |
| 3,074,034 | 1/1963 | Crownover | 310/312 X |
| 3,808,752 | 5/1974 | Beaver | 310/312 X |
| 4,062,154 | 12/1977 | Huguenin et al. | 29/25.35 X |
| 4,131,484 | 12/1978 | Caruso et al. | 310/312 X |
| 4,385,473 | 5/1983 | Aoki et al. | 51/281 R |
| 4,561,286 | 12/1985 | Sekler et al. | 310/312 X |
| 5,045,745 | 9/1991 | Umemoto et al. | 310/329 |

*Primary Examiner*—Mark O. Budd
*Attorney, Agent, or Firm*—Nikaido, Marmelstein, Murray & Oram

[57] ABSTRACT

A vibrating gyroscope is mounted on a cutting device. The vibrating gyroscope is heated by halogen lamps, and a drift due to temperature variation is measured by a drift measuring device. Resonance frequencies in plural directions of the vibrating gyroscope are measured by a frequency measuring device. A cutting quantity of a vibrating body of the vibrating gyroscope is calculated from the drift due to a temperature variation and a difference of plural resonance frequencies by a control device. The cutting quantity of the vibrating body is decided by deliberating the cutting quantity obtained experientially. When the cutting quantity of the vibrating body is decided, rotating bar files are pressed against the vibrating body responsive thereto, thereby the vibrating body is cut.

9 Claims, 3 Drawing Sheets

ADJUSTING APPARATUS OF VIBRATING GYROSCOPE

BACKGROUND OF THE INVENTION

1. Field of the Invention

The present invention relates to an adjusting apparatus of a vibrating gyroscope, and more particularly to an adjusting apparatus of the vibrating gyroscope for obtaining the gyroscope having a good characteristics.

2. Description of the Prior Art

FIG. 3 is a perspective view showing an example of a vibrating gyroscope, and FIG. 4 is a sectional view thereof. The vibrating gyroscope 10 includes, for example, a regular triangular prism shaped vibrating body 12. The vibrating body 12 is formed, generally, by a material which generates mechanical vibration, such as elinver, iron-nickel alloy, quartz, glass, crystal, ceramics and the like.

At center portions on three side faces of the vibrating body 12, piezoelectric elements 14a, 14b and 14c are formed. The piezoelectric element 14a includes a piezoelectric layer 16a consisting of, for example, a piezoelectric ceramic. On both faces of the piezoelectric layer 16a, electrodes 18a and 20a are formed. One electrode 20a is bonded to the side face of the vibrating body 12. Similarly, the piezoelectric elements 14b, 14c include piezoelectric layers 16b, 16c, on the both faces of which electrodes 18b, 20b and electrodes 18c, 20c are formed. The electrodes 20b, 20c of the piezoelectric elements 14b, 14c are bonded to the side faces of the vibrating body 12.

Supporting members 22a and 22b are fixed to a ridge line near two nodal points of the vibrating body 12. The supporting members 22a and 22b are formed by bending metal wires into a U shape. Center portions of the supporting members 22a and 22b are welded to the ridge line of the vibrating body 12. End portions of the supporting members 22a and 22b are secured to a supporting plate 24.

In such vibrating gyroscope 10, when designating the ridge line between the piezoelectric elements 14a and 14b is taken as C, the ridge line between the piezoelectric elements 14a and 14c as L, and the ridge line between the piezoelectric elements 14b and 14c as R, the piezoelectric elements 14a, 14b on both sides of the ridge line C are used for detection and drive, and the piezoelectric element 14c is used for feedback. When using the vibrating gyroscope 10, a oscillation circuit is connected between the piezoelectric elements 14a, 14b for drive and the piezoelectric element 14c for feedback, and a drive signal is applied to the vibrating gyroscope 10 from the oscillation circuit. The vibrating body 12 bends and vibrates in a direction perpendicular to the face of the piezoelectric element 14c by the driving signal.

In this state, output signals from the piezoelectric elements 14a and 14b used for detection are equal and the difference is zero when measured. When the vibrating body 12 rotates on its axis, a vibrating direction changes due to a Coriolis force, and thereby the output signals differ between the piezoelectric elements 14a and 14b. Thus, when the difference of the output signals between the piezoelectric elements 14a and 14b is measured, a rotational angular velocity can be detected.

In such vibrating gyroscope 10, since detection of the rotational angular velocity is unstable when the biased vibration is generated due to the driving direction, frequencies in the respective vibrating directions are adjusted by cutting the ridge lines of the vibrating body 12. In this case, first, the oscillation circuit is connected between the piezoelectric elements 14a, 14b on both sides of the ridge line C and the piezoelectric element 14c, thereby the vibrating body 12 bends and vibrates in the direction perpendicular to the face of the piezoelectric element 14c. A resonance frequency Fx at that time is measured. Similarly, a resonance frequency Fy 1 is measured by connecting the oscillation circuit between the piezoelectric elements 14a, 14c on both sides of the ridge line L and the piezoelectric element 14b, and a resonance frequency Fy2 is measured by connecting the oscillation circuit between the piezoelectric elements 14b, 14c on both sides of the ridge line R and the piezoelectric element 14a. The ridge lines of the vibrating body 12 are cut so as to bring the differences between the resonance frequencies Fx, Fy1 and Fy2 within zero Hz to several Hz. By adjusting the resonance frequencies in the vibrating directions in such a manner, the vibrating body 12 can be vibrated stably and a good characteristics can be obtained.

However, in the vibrating gyroscope, there is not only the difference in resonance frequencies, but also output fluctuations of the detecting piezoelectric elements due to the temperature variations are encountered. When such drift due to a temperature variation is large, the vibrating body vibrates unstably to detect the rotational angular velocity erroneously, nevertheless there is no rotational angular velocity.

SUMMARY OF THE INVENTION

It is, therefore, a primary object of the present invention to provide an adjusting apparatus of a vibrating gyroscope capable of reducing a drift due to the temperature variations.

The present invention is directed to an adjusting apparatus of a vibrating gyroscope for adjusting the vibrating gyroscope utilizing vibration of a vibrating body, comprising: heating means for heating the vibrating gyroscope; drift measuring means for measuring a drift due to a temperature variation obtained from the vibrating gyroscope by heating with the heating means; frequency measuring means for measuring resonance frequencies of multi-directional vibrations of the vibrating gyroscope; operation means for calculating a cutting quantity of the vibrating gyroscope from the drift due to a temperature variation measured by the drift measuring means and the resonance frequencies measured by the frequency measuring means; and cutting means for cutting the vibrating gyroscope responsive to the cutting quantity calculated by the operation means.

In the operation means of the adjusting apparatus, a variation quantity of the drift due to a temperature variation is calculated from the drift of the vibrating gyroscope at the plural temperatures, a cutting quantity of the vibrating gyroscope is calculated from the variation quantity of the drift, and cutting positions and a cutting quantity of the vibrating gyroscope are decided by a weighted mean of the calculated cutting quantity and a cutting quantity obtained experientially from the variation quantity of the drift due to the temperature variation, and furthermore, whether to finish or to continue cutting of the vibrating gyroscope is determined by measuring the drift due to the temperature variation again after cutting the vibrating gyroscope.

Though complicated factors are included in a case of generating the drift due to the temperature variation, it is believed that the drift can be reduced without unbalanced vibration, as long as the vibrating body has an equal moment of momentum in both sides, at least, against the ridge line including the supporting points of the vibrating body. The different moment of momentum in both sides can be adjusted by cutting the ridge line of the vibrating body. The cutting positions and the quantity of the vibrating body are decided from a variation quantity of the drift due to a temperature variation.

Since the relationship between the drift due to the temperature variation and the cutting quantity of the vibrating body is, in practice, complicated in many cases, there is a difference between the experiential variation quantity of the drift and those at the time of cutting practically. Therefore, the calculated cutting quantity and the experiential cutting quantity are weighted to find the weighted mean, and to obtain the cutting quantity to which the experiential quantity is deliberated. Meanwhile, since there is such an effect as deteriorating sensitivity when the detuning frequency becomes higher, the cutting quantity is decided in the operation means to adjust the resonance frequencies in the respective vibrating directions.

According to the present invention, since the cutting quantity of the vibrating body is decided by measuring the drift due to a temperature variation, and furthermore, the cutting quantity relative to the variation quantity of the drift obtained experientially is deliberated, the drift due to a temperature variation of the vibrating gyroscope can be reduced. Thus, when the vibrating gyroscope adjusted by this adjusting apparatus is used, the rotational angular velocity is prevented from erroneous detection even when the ambient temperature changes. For instance, in the case of using the vibrating gyroscope which has been adjusted by the conventional adjusting apparatus in a navigation system, though there was the case of being mistakenly judged to be curving irrespective of forwarding due to the ambient temperature variation, when the vibrating gyroscope which has been adjusted by this adjusting apparatus is used, such misjudgment can be prevented.

The above and other objects, features, aspects and advantages of the present invention will become more apparent from the following detailed description of the embodiment made with reference to the drawings.

DESCRIPTION OF THE PREFERRED EMBODIMENTS

Figure 1:
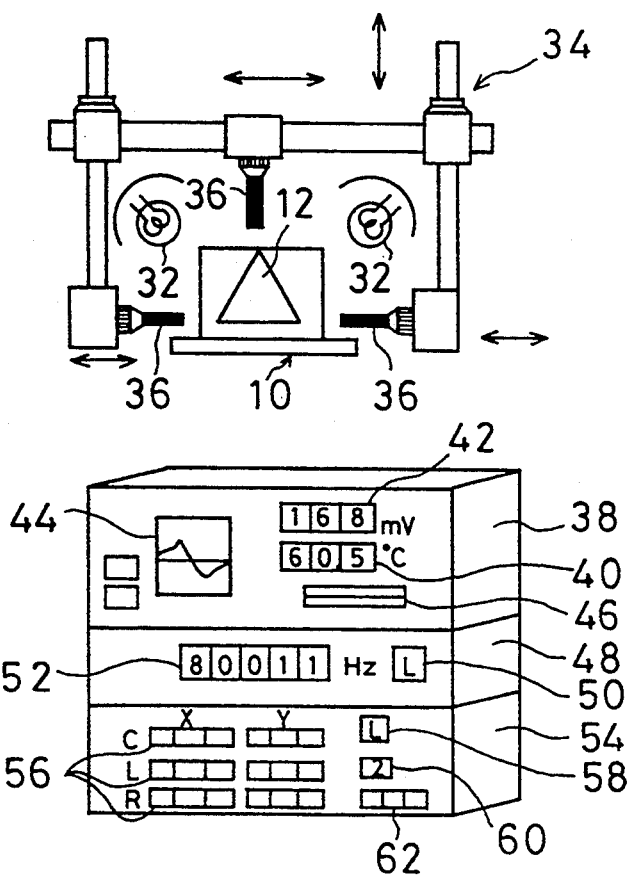
FIG. 1 is an illustrative view showing one embodiment of the present invention.
Figure 3:
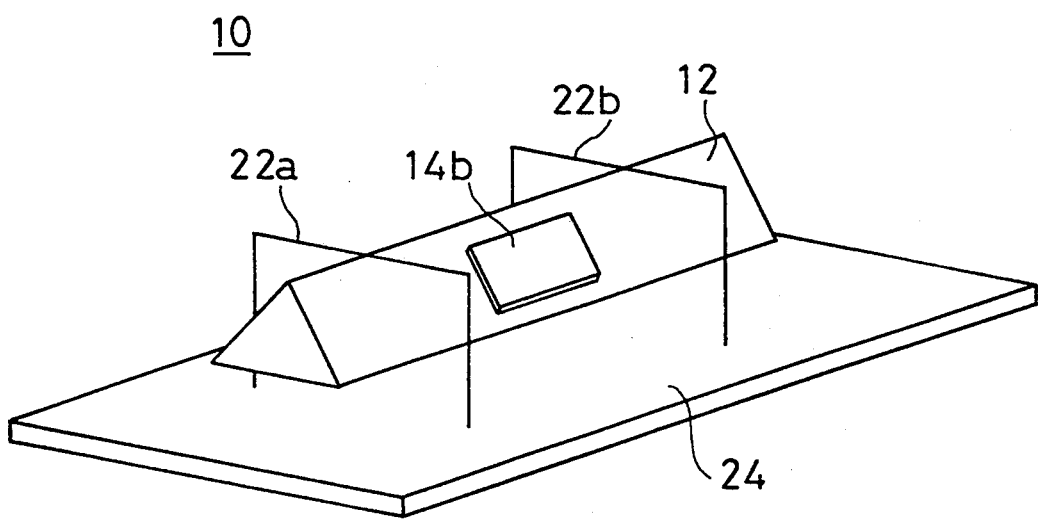
FIG. 3 is a perspective view showing an example of a vibrating gyroscope adjusted by an adjusting apparatus.
Figure 4:
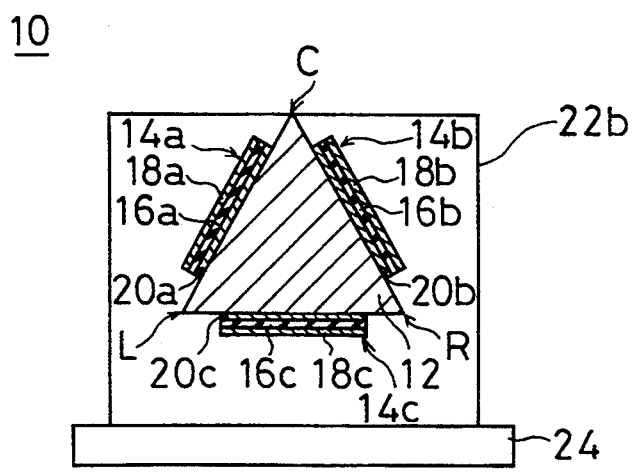
FIG. 4 is a sectional view showing a vibrating gyroscope shown in FIG. 3.

FIG. 1 is an illustrative view showing one embodiment of the present invention. An adjusting apparatus 30 of a vibrating gyroscope comprises halogen lamps 32 as heating means. The vibrating gyroscope 10 shown in FIG. 3 is heated by the halogen lamps 32. As other heating means, for example, hot air may be blown to the vibrating gyroscope 10 by drier. A heating temperature is measured by a thermocouple or an infrared ray thermometer.

Furthermore, the adjusting apparatus 30 comprises a cutting device 34 as cutting means. The cutting device 34 includes three bar files 36. The bar files 36 are arranged at the positions corresponding to three ridge lines of a vibrating body 12. By pressing the rotating bar files 36 against the vibrating body 12, the ridge lines of the vibrating body 12 are cut. Though the cutting positions of the vibrating body 12, pressing load of the bar files 36 against the vibrating body 12, a cutting length, a cutting frequency and so on are considered as the cutting conditions, in most cases, the other conditions are adjusted while keeping the cutting load and length constant.

The adjusting apparatus 30 also comprises a drift measuring device 38 as drift measuring means. The drift measuring device 38 is for measuring the drift of the vibrating gyroscope 10 due to a temperature variation. In this case, the vibrating gyroscope 10 is heated by the halogen lamps 32 and variations of an output signal from the vibrating gyroscope 10 is measured by the drift measuring device 38. On the drift measuring device 38, a temperature indicator 40 for indicating the temperature of the vibrating gyroscope 10 and a drift quantity indicator 42 for indicating a drift quantity at that temperature are formed. Furthermore, in the drift measuring device 38, an oscilloscope 44 for showing the relationship between the temperature and the drift quantity is formed. A floppy disc system 46 for recording these data is also formed in the drift measuring device 38.

Meanwhile, the adjusting apparatus 30 comprises a frequency measuring device 48. Resonance frequencies in respective vibrating directions of the vibrating body 12 of the vibrating gyroscope 10 are measured by the frequency measuring device 48. On the frequency measuring device 48, a vibrating direction indicator 50 for indicating the vibrating direction of the vibrating gyroscope 10 being measured, and a frequency indicator 52 for indicating the resonance frequency in the vibrating direction are formed.

Data obtained by the drift measuring device 38 and the frequency measuring device 48 are processed by a control device 54 including operation means. On the control device 54, a position indicators of the cutting means 56 for indicating the positions of the bar files 36 as the cutting means are formed. On the position indicators 56, the positions of the bar files 36 are indicated in coordinates. When the ridge line of the vibrating body 12 to be cut is decided in response to the resulting data, the ridge line is indicated on a cutting position indicator 58. When the cutting quantity of the vibrating body 12 is decided, the cutting frequency and length for obtaining the cutting quantity are calculated, and indicated respectively on a cutting frequency indicator 60 and a cutting length indicator 62. Movement of the bar files 36 is controlled by the cutting position, frequency and length.

Figure 2:
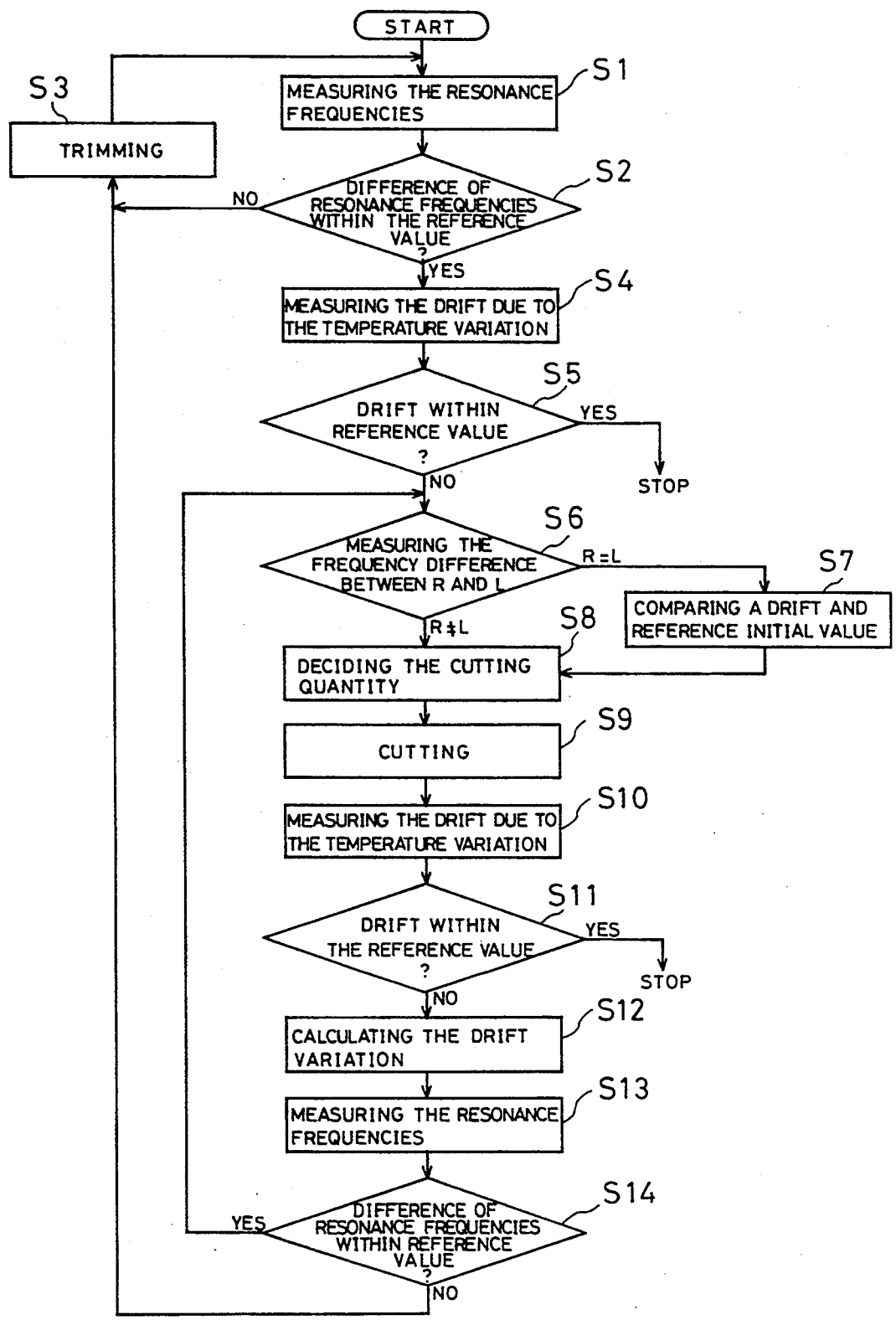
FIG. 2 is a flow chart showing the operation of an adjusting apparatus of a vibrating gyroscope shown in FIG. 1.

Next, a method of adjusting the vibrating gyroscope 10 by using the adjusting apparatus 30 is described with reference to a flow chart shown in FIG. 2. First, in Step S1, the bending and vibrating resonance frequencies in three directions of the vibrating gyroscope 10 are measured by the frequency measuring device 48. In this case, the resonance frequencies of the vibrating body 12 in the directions perpendicular to the faces, whereon the piezoelectric elements 14a, 14b and 14c are formed, are measured. In Step S2, the difference of resonance frequencies is detected by the control device 54, and when a maximum difference value of the resonance frequencies comes off from a reference value, the cutting position and quantity of the vibrating body 12 are calculated so that the difference of resonance frequencies comes within the reference value. In Step S3, movement of the bar files 36 is controlled to cut the vibrating body 12. Such process is repeated until the difference of three resonance frequencies of the vibrating body 12 comes within the reference value.

When the maximum difference value of the resonance frequencies of the vibrating body 12 comes within the reference value, in Step S4, the drift of the vibrating gyroscope 10 due to a temperature variation is measured by the drift measuring device 38. First, an output voltage $V_0$ of the vibrating gyroscope 10 is measured at a room temperature $T_0$. Next, the vibrating gyroscope 10 is heated by the halogen lamps 32. When an output voltage of the vibrating gyroscope 10 at a temperature T is V, the drift D due to the temperature variation is represented by the following equation.

$$D=(V-V_0)/(T-T_0)$$

Then, in Step S5, the resulting drift D is compared with a preset reference value. When the drift D is within the reference value, the vibrating gyroscope 10 need not be adjusted and the adjusting apparatus 30 is stopped. When the drift D comes off from the reference value, in Step S6, the output signal frequency difference of the vibrating gyroscope 10 is measured. When there is no output signal frequency difference, in Step S7, the drift D and a reference data initial value are compared. The reference data initial value is a value showing the relationship between the experientially obtained drift and the cutting quantity. In Step S8, the cutting quantity of the vibrating body 12 is decided from the reference data initial value. The cutting quantity of the vibrating body 12 is decided by the cutting frequencies of the vibrating body 12 by the bar files 36, as keeping the pressing load of the bar files 36 against the vibrating body 12 and the cutting length constant. When there is the output signal frequency difference, in Step S8, the cutting quantity of the vibrating body 12 is decided independently from the reference data initial value.

When the cutting quantity of the vibrating body 12 is decided, in Step S9, the ridge lines of the vibrating body 12 are cut. At this time, the control device 54 controls the movement of the bar files 36, thereby the ridge lines of the vibrating body 12 are cut. When the vibrating body 12 is cut, in Step S10, the drift due to the temperature variation is measured again. In this case, the drift of the vibrating gyroscope 10 is measured at the temperature which is different from the measurement temperature in Step S4. In Step S11, the drift is compared with the reference value, and when the drift is within the reference value, the adjusting apparatus 30 is stopped.

When the drift of the vibrating gyroscope 10 comes off the reference value, in Step S12, the drift variation is calculated. When the drift measured at the first time is D(1) and that measured at the second time is D(2), the drift variation $\Delta D(1)$ is represented by the following equation.

$$\Delta D(1)=D(2)-D(1)$$

When the cutting frequencies of the vibrating body 12 in Step S9 are N(1), the drift variation d per one cutting frequency is represented by the following equation.

$$d=\Delta D(1)/N(1)$$

Thus, the next cutting quantity of the vibrating body 12 can be obtained by dividing the drift D(2) measured in Step S10 with the drift variation d per one cutting frequency.

Since complicated factors are included as a cause of the drift of the vibrating gyroscope 10 due to the temperature variation, the cutting quantity of the vibrating body 12 is decided by deliberating experientially obtained data. That is, the actual cutting quantity is decided by a weighted mean obtained by adding a suitable weight to the cutting quantity calculated by measuring the drift and the cutting quantity obtained experientially, as referring to a table of cutting frequencies and drift variations prepared experientially.

Meanwhile, in Step S13, the vibration resonance frequencies of the vibrating gyroscope 10 in three directions are measured again. Then, in Step S14, the maximum difference value of the resonance frequencies in the respective directions is compared with the reference value. When the maximum difference value of the resonance frequencies is within the reference value, the processing returns to Step S6, wherein the vibrating body 12 is cut according to the cutting quantity calculated by the drift variation obtained in Step S12. When the maximum difference value of the resonance frequencies is out of the reference value, the processing returns to Step S3, wherein the resonance frequency is adjusted. The process is repeated from Step S1, and the drift of the vibrating gyroscope 10 due to the temperature variation is adjusted to become smaller.

Such adjustments are repeated and the drift of the vibrating gyroscope 10 is reduced. When the drift of the vibrating gyroscope 10 comes within the reference value, the adjusting apparatus 30 is stopped and adjustment of the vibrating gyroscope 10 is finished.

As such, when the adjusting apparatus 30 of the vibrating gyroscope 10 is used, not only the resonance frequency difference of the vibrating body 12, but also the drift due to the temperature variation can be reduced. Besides, since the drift of the vibrating gyroscope 10 can be adjusted while being measured, the accurate adjustment is possible. Thus, when the vibrating gyroscope 10 adjusted by this adjusting apparatus 30 is used, unnecessary signals generated by the ambient temperature variations are little, and erroneous detections of the rotational angular velocity can be prevented.

While the present invention has been particularly described and shown, it is to be understood that such description used merely as an illustration and example rather than limitation, and the spirit and scope of the present invention is determined solely by the terms of the appended claims.

What is claimed is:

1. An adjusting apparatus of a vibrating gyroscope for adjusting the vibrating gyroscope utilizing vibration of a vibrating body, comprising:

heating means for heating said vibrating gyroscope;

drift measuring means for measuring a drift due to a temperature variation obtained from said vibrating gyroscope by heating with said heating means;

frequency measuring means for measuring resonance frequencies of multi-directional vibrations of said vibrating gyroscope;

operation means for calculating a cutting quantity of said vibrating gyroscope from the drift due to the temperature variation measured by said drift measuring means and the resonance frequencies measured by said frequency measuring means; and cutting means for cutting said vibrating gyroscope responsive to the cutting quantity calculated by said operation means.

2. An adjusting apparatus of a vibrating gyroscope in accordance with claim 1, wherein in said operation means, a variation quantity of the drift due to the temperature variation is calculated from the drift of said vibrating gyroscope at plural temperatures, a cutting quantity of said vibrating gyroscope is calculated from the variation quantity of drift, cutting positions and quantity of said vibrating gyroscope are decided by a weighted means of the calculated cutting quantity and a cutting quantity obtained experientially from the variation quantity of the drift due to the temperature variation, and furthermore, whether to finish or to continue cutting of said vibrating gyroscope is determined by measuring the drift of said vibrating gyroscope due to the temperature variation again after cutting said vibrating gyroscope.

3. An adjusting apparatus of a vibrating gyroscope in accordance with claim 1, wherein a halogen lamp is used as said heating means.

4. An adjusting apparatus of a vibrating gyroscope in accordance with claim 1, wherein bar file is used as said cutting means.

5. An adjusting apparatus of a vibrating gyroscope in accordance with claim 1, wherein said vibrating body is formed into a regular triangular prism shape, and a ridge line of said vibrating body is cut by said cutting means.

6. An adjusting apparatus of a vibrating gyroscope in accordance with claim 4, wherein said vibrating body is formed into a regular triangular prism shape, and a ridge line of said vibrating body is cut by said bar file.

7. An adjusting apparatus of a vibrating gyroscope in accordance with claim 2, wherein a bar file is used as said cutting means.

8. An adjusting apparatus of a vibrating gyroscope in accordance with claim 2, wherein said vibrating body is formed into a regular triangular prism shape, and a ridge line of said vibrating body is cut by said cutting means.

9. An adjusting apparatus of a vibrating gyroscope in accordance with claim 7, wherein said vibrating body is formed into a regular triangular prism shape, and a ridge line of said vibrating body is cut by said bar file.

* * * * *